(12) United States Patent
Iwami

(10) Patent No.: US 12,705,864 B2
(45) Date of Patent: Aug. 11, 2026

(54) POINT CLOUD DATA PROCESSING APPARATUS, POINT CLOUD DATA PROCESSING METHOD, AND PROGRAM

(71) Applicant: FUJIFILM Corporation, Tokyo (JP)

(72) Inventor: Kazuchika Iwami, Tokyo (JP)

(73) Assignee: FUJIFILM Corporation, Tokyo (JP)

( * ) Notice: Subject to any disclaimer, the term of this patent is extended or adjusted under 35 U.S.C. 154(b) by 595 days.

(21) Appl. No.: 17/816,235

(22) Filed: Jul. 29, 2022

(65) Prior Publication Data

US 2022/0366673 A1 Nov. 17, 2022

Related U.S. Application Data

(63) Continuation of application No. PCT/JP2020/045365, filed on Dec. 7, 2020.

(30) Foreign Application Priority Data

Feb. 18, 2020 (JP) ................................ 2020-025448

(51) Int. Cl.
*G06V 10/771* (2022.01)
*G06V 10/98* (2022.01)

(52) U.S. Cl.
CPC ............ *G06V 10/771* (2022.01); *G06V 10/98* (2022.01)

(58) Field of Classification Search
CPC ...... G06V 10/20; G06V 10/22; G06V 10/225; G06V 10/235; G06V 10/24; G06V 10/242;

(Continued)

(56) References Cited

U.S. PATENT DOCUMENTS 12,579,655 B1 * 3/2026 Roth ........................ G06T 7/143
2010/0034426 A1 2/2010 Takiguchi et al.

(Continued)

FOREIGN PATENT DOCUMENTS

CN 109472852 A 3/2019
JP 2012-083157 A 4/2012

(Continued)

OTHER PUBLICATIONS

Zimmer W, Rangesh A, Trivedi M. 3d bat: A semi-automatic, web-based 3d annotation toolbox for full-surround, multi-modal data streams. In2019 IEEE Intelligent Vehicles Symposium (IV) Jun. 9, 2019 (pp. 1816-1821). IEEE. (Year: 2019).*

(Continued)

*Primary Examiner* — Ming Y Hon
*Assistant Examiner* — Amanda H Pearson
(74) *Attorney, Agent, or Firm* — Studebaker Brackett PLLC

(57) ABSTRACT

A point cloud data processing apparatus (11) includes: a memory (21) configured to store point cloud data (7) and pieces of image data (5), with positions of pixels of at least any one piece of image data (5) among the pieces of image data (5) being associated with points that constitute the point cloud data (7); and a processor, the processor being configured to cause a display unit (9) to display the point cloud data such that three-dimensional rotation, three-dimensional movement, and rescaling are enabled, accept a designation of a specified point in the point cloud data (7) displayed on the display unit (9), select a region of a target object including a region corresponding to the specified point, on the piece of image data (5), and assign the same attribute information to points, in the point cloud data (7), corresponding to the region of the target object.

20 Claims, 9 Drawing Sheets

(58) Field of Classification Search

CPC .... G06V 10/247; G06V 10/248; G06V 10/70; G06V 10/77; G06V 10/7715; G06V 10/40; G06V 10/44; G06V 20/647; G06V 20/653; G06T 7/10; G06T 7/11; G06T 7/30; G06T 7/32; G06T 7/33; G06T 7/337; G06T 7/70; G06T 7/73; G06T 7/97; G06T 19/00; G06T 19/003; G06T 19/006; G06T 19/20; G06T 17/00; G06T 2200/24; G06T 2210/56; G06T 2219/004; G06T 2219/2016

See application file for complete search history.

(56) References Cited

U.S. PATENT DOCUMENTS

| | | | | |
|---|---|---|---|---|
| 2018/0068492 | A1 | 3/2018 | Morikawa et al. | |
| 2018/0143756 | A1* | 5/2018 | Mildrew | G06F 3/013 |
| 2019/0096135 | A1* | 3/2019 | Dal Mutto | G06F 18/24765 |
| 2019/0380792 | A1* | 12/2019 | Poltaretskyi | H04N 13/122 |
| 2020/0278450 | A1 | 9/2020 | Lasang et al. | |
| 2022/0319043 | A1* | 10/2022 | Chandler | G06T 7/70 |

FOREIGN PATENT DOCUMENTS

| | | | |
|---|---|---|---|
| JP | 2017-130146 | A | 7/2017 |
| JP | 2018-041192 | A | 3/2018 |
| WO | 2008/099915 | A1 | 8/2008 |
| WO | 2019/098318 | A1 | 5/2019 |

OTHER PUBLICATIONS

Boyko, A.S., 2015. Efficient interfaces for accurate annotation of 3D point clouds (Doctoral dissertation, Princeton University). (Year : 2015).*

A semi-automatic, web-based 3d annotation toolbox for full-surround, multi-modal data streams (Year: 2019).*

An Office Action mailed by China National Intellectual Property Administration on Aug. 17, 2024, which corresponds to Chinese Patent Application No. 202080096126.7 and is related to U.S. Appl. No. 17/816,235; with English language translation.

Scanner2GO GmbH, "09—Leica CloudWorx TruSpace—Scanner2GO", YouTube.com, Nov. 10, 2019, 1 page, https://www.youtube.com/watch?v=s6QVHPSgSKk, XP055813021.

Leica Geosystems AG, "Leica CloudWorx 4.0 for MicroStation", brochure, 2010, pp. 1-6, Switzerland, XP055118007.

Wand, Michael et al., "Interactive Editing of Large Point Clouds", Eurographics Symposium on Point-Based Graphics, 2007, doi: 10.2312/spbg/spbg07/037-045, 9 pages, XP093053070.

The extended European search report issued by the European Patent Office on Jun. 20, 2023, which corresponds to European Patent Application No. 20919406.7-1207 and is related to U.S. Appl. No. 17/816,235.

International Search Report issued in PCT/JP2020/045365; mailed Feb. 16, 2021.

International Preliminary Report on Patentability and Written Opinion issued in PCT/JP2020/045365; issued Aug. 23, 2022.

* cited by examiner

11
POINT CLOUD DATA PROCESSING APPARATUS
5
IMAGE DATA
7
POINT CLOUD DATA
13
IMAGE DATA ACQUISITION UNIT
15
POINT CLOUD DATA ACQUISITION UNIT
17
23
DESIGNATION ACCEPTING UNIT
25
REGION SELECTING UNIT
27
ATTRIBUTE ASSIGNING UNIT
19
DISPLAY CONTROL UNIT
21
STORAGE UNIT
9
MONITOR

POINT CLOUD DATA PROCESSING APPARATUS, POINT CLOUD DATA PROCESSING METHOD, AND PROGRAM

CROSS-REFERENCE TO RELATED APPLICATIONS

This application is a Continuation of PCT International Application No. PCT/JP2020/045365 filed on Dec. 7, 2020, which claims priority under 35 U.S.C § 119(a) to Japanese Patent Application No. 2020-025448 filed on Feb. 18, 2020. Each of the above application(s) is hereby expressly incorporated by reference, in its entirety, into the present application.

BACKGROUND OF THE INVENTION

1. Field of the Invention

The present invention relates to a point cloud data processing apparatus, a point cloud data processing method, and a non-transitory computer readable recording medium storing a program and specifically relates to a technique for assigning attribute information to points that constitute point cloud data.

2. Description of the Related Art

A technique using, for example, a laser scanner is known in which reflection on the surface of an object is used to acquire point cloud data constituted by a large number of points (point cloud) representing three-dimensional information of the surface of the object. Recently, the use of such point cloud data in various forms has been studied.

Meanwhile, measured point cloud data itself is large in volume and has a problem of handling when the point cloud data is to be used. Therefore, point cloud data is often modeled (for example, a solid model or a surface model) to thereby reduce the volume of the point cloud data.

In a case of modeling point cloud data, attribute information needs to be assigned to each of the point clouds that constitute the point cloud data (grouping needs to be performed), on a measured object by measured object basis. For example, when a plurality of objects are measured, attribute information needs to be assigned to a point cloud for each of the objects.

Accordingly, in a case of assigning attribute information to a point cloud, it is often the case that, for example, a user manually selects points, identifies a point cloud that corresponds to an object, and assigns the same attribute information to the identified point cloud.

In a technique described in JP2012-83157A, one point included in the region of a target object is specified on image data, the region of the target object is determined on the basis of the specified one point, and grouping is performed for a point cloud that corresponds to the determined region of the target object.

SUMMARY OF THE INVENTION

A measurement target that is measured by a laser scanner is not always an object having a simple form, and may be constituted by a plurality of complicated objects or constituted by objects that overlap and are disposed complicatedly. For example, in a case of measurement of piping, a plurality of pipes may be disposed so as to overlap, and even in such a case, attribute information needs to be assigned to a point cloud for each of the pipes.

In a case of such a measurement target, a user manually selects points and assigns attribute information, which takes considerable time. The user may erroneously select a point. Therefore, in a case where a measurement target is constituted by a plurality of complicated objects or constituted by objects that overlap and are disposed complicatedly, efficient operations are difficult with the technique in which the user manually selects points.

As described in JP2012-83157A, with the technique in which a target object is specified on image data displayed in two dimensions and a point cloud that is to be assigned attribute information is identified, an overlapped target object may hidden behind another target object in the image data displayed two-dimensionally, and selection might not be accurately made. Therefore, with the technique as described in JP2012-83157A, attribute information might not be accurately assigned to a point cloud.

The present invention has been made in view of the above-described circumstances, and an object thereof is to provide a point cloud data processing apparatus, a point cloud data processing method, and a non-transitory computer readable recording medium storing a program with which attribute information can be efficiently and accurately assigned to a point cloud.

To achieve the above-described object, a point cloud data processing apparatus according to an aspect of the present invention is a point cloud data processing apparatus including: a memory configured to store point cloud data representing pieces of three-dimensional information of a large number of points on a surface of an object and a plurality of pieces of image data acquired by image capturing of the object, with positions of pixels of at least any one piece of image data among the plurality of pieces of image data being associated with points that constitute the point cloud data; and a processor, the processor being configured to cause a display unit to display the point cloud data such that three-dimensional rotation, three-dimensional movement, and rescaling are enabled, accept a designation of a specified point in the point cloud data displayed on the display unit, select a region of a target object including a region corresponding to the specified point, on the piece of image data, and assign the same attribute information to points, in the point cloud data, corresponding to the region of the target object.

According to this aspect, point cloud data is displayed on the display unit such that three-dimensional rotation, three-dimensional movement, and rescaling are enabled, and a designation of a specified point in the point cloud data is accepted. In this aspect, the region of a target object including a region corresponding to the specified point is selected on image data, and the same attribute information is assigned to points that correspond to the region. Therefore, with this aspect, attribute information can be efficiently and accurately assigned to point cloud data.

Preferably, the processor is configured to select the region of the target object on the piece of image data with a recognizer subjected to machine learning.

Preferably, the processor is configured to cause the display unit to display the piece of image data of the region corresponding to the specified point after accepting the designation of the specified point.

Preferably, the processor is configured to combine and display the plurality of pieces of image data on the display unit.

Preferably, the processor is configured to accept selection of the region of the target object selected on the piece of image data displayed on the display unit.

Preferably, the processor is configured to, with respect to the point cloud data that is assigned the attribute information, correct assignment of the attribute information with a recognizer subjected to machine learning.

Preferably, the processor is configured to display the point cloud data that is assigned the attribute information on the display unit, and accept a correction concerning assignment of the attribute information and correct the assigned attribute information.

Preferably, the processor is configured to acquire the pieces of image data and the point cloud data that are acquired by devices having the same optical axis.

A point cloud data processing method according to another aspect of the present invention is a point cloud data processing method for a point cloud data processing apparatus including: a memory configured to store point cloud data representing pieces of three-dimensional information of a large number of points on a surface of an object and a plurality of pieces of image data acquired by image capturing of the object, with positions of pixels of at least any one piece of image data among the plurality of pieces of image data being associated with points that constitute the point cloud data; and a processor, the processor being configured to perform a step of causing a display unit to display the point cloud data such that three-dimensional rotation, three-dimensional movement, and rescaling are enabled, a step of accepting a designation of a specified point in the point cloud data displayed on the display unit, a step of selecting a region of a target object including a region corresponding to the specified point, on the piece of image data, and a step of assigning the same attribute information to points, in the point cloud data, corresponding to the region of the target object.

A program stored in a non-transitory computer readable recording medium according to yet another aspect of the present invention is a program for causing a point cloud data processing apparatus to perform a point cloud data processing method, the point cloud data processing apparatus including: a memory configured to store point cloud data representing pieces of three-dimensional information of a large number of points on a surface of an object and a plurality of pieces of image data acquired by image capturing of the object, with positions of pixels of at least any one piece of image data among the plurality of pieces of image data being associated with points that constitute the point cloud data; and a processor, the program causing the processor to perform a step of causing a display unit to display the point cloud data such that three-dimensional rotation, three-dimensional movement, and rescaling are enabled, a step of accepting a designation of a specified point in the point cloud data displayed on the display unit, a step of selecting a region of a target object including a region corresponding to the specified point, on the piece of image data, and a step of assigning the same attribute information to points, in the point cloud data, corresponding to the region of the target object.

According to the present invention, point cloud data is displayed on the display unit such that three-dimensional rotation, three-dimensional movement, and rescaling are enabled, a designation of a specified point in the point cloud data is accepted, the region of a target object including a region corresponding to the specified point is selected on image data, and the same attribute information is assigned to points that correspond to the region, and therefore, attribute information can be efficiently and accurately assigned to a point cloud.

DESCRIPTION OF THE PREFERRED EMBODIMENTS

Hereinafter, a preferred embodiment of a point cloud data processing apparatus, a point cloud data processing method, and a program according to the present invention will be described with reference to the attached drawings.

Figure 1:
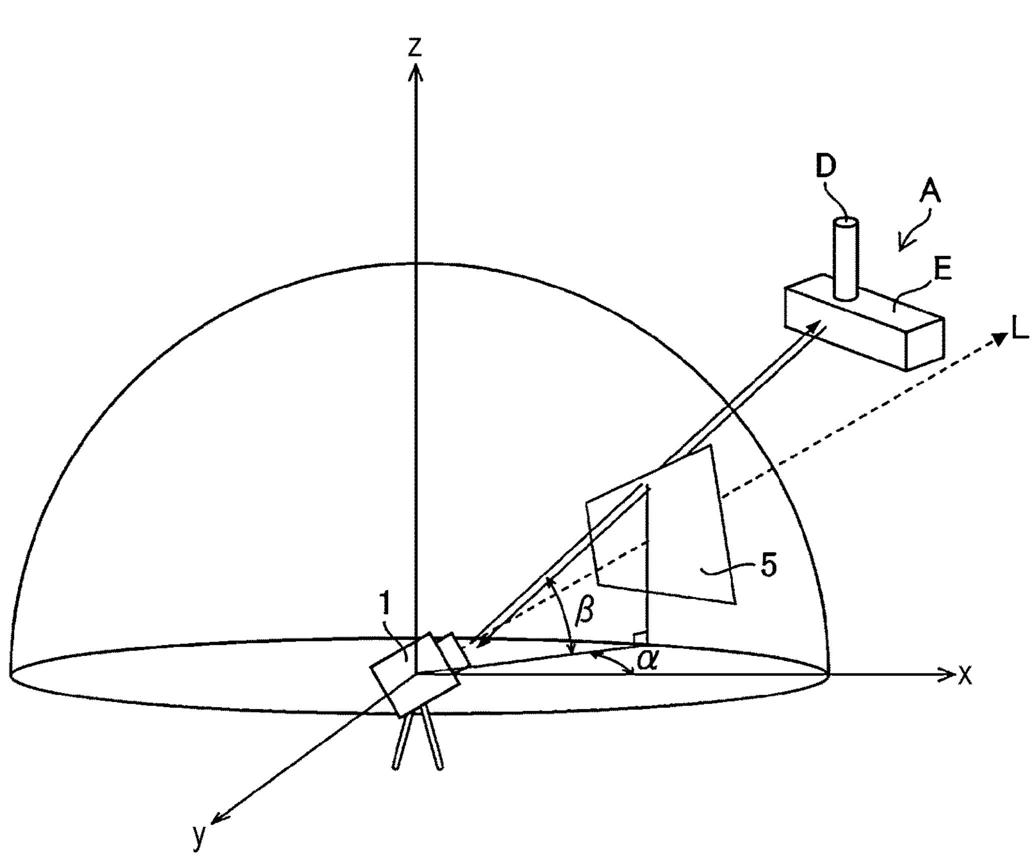
FIG. 1 is a schematic diagram illustrating a form in which image data and point cloud data are acquired by a three-dimensional measuring device.

FIG. 1 is a schematic diagram illustrating a form in which image data 5 and point cloud data 7 that are input to a point cloud data processing apparatus 11 (see FIG. 4) are acquired by a three-dimensional measuring device 1.

As illustrated in FIG. 1, the three-dimensional measuring device 1 acquires point cloud data of an object A that is a measurement target and the image data 5 of the object A that is a photographic subject. The object A is constituted by an object D and an object E.

A laser scanner 101 (see FIG. 2) mounted in the three-dimensional measuring device 1 is a time-of-flight laser scanner that emits a laser pulse and uses the time taken by the laser pulse to return after reflection on the surface of the object A that is a measurement target to measure the distance. The laser scanner 101 acquires angle information of the emission direction of the laser pulse (FIG. 1 illustrates a horizontal direction $\alpha$ and a vertical direction $\beta$) with reference to the center of rotation of the laser scanner 101. The laser scanner 101 acquires three-dimensional information of the reflection point of the laser pulse on the basis of the measured distance and the angle information of the emission direction of the laser pulse. The laser scanner 101 acquires pieces of three-dimensional information of a large number of points while changing the horizontal direction $\alpha$ and the vertical direction $\beta$ that define the emission direction of the laser pulse, by a predetermined pitch. Here, point cloud data is data that represents pieces of three-dimensional information of a large number of points on the surface of the measurement target object, and each of the points constituting the point cloud data has a piece of three-dimensional information (three-dimensional coordinates). The laser scanner 101 need not be of a time-of-flight type and may be one that acquires point cloud data with a phase difference method or a trigonometry method.

The three-dimensional measuring device 1 acquires the image data 5 with an image capturing device 102 (see FIG. 2) mounted therein and having an optical axis L. The image capturing device 102 includes, for example, a CCD (charge-coupled device) imaging element (not illustrated). The imaging element has a plurality of pixels that are photoelectric elements arranged in two dimensions, namely, in an x direction (horizontal direction) and a y direction (vertical direction), and includes, for example, a color filter (not illustrated), in which R (red), G (green), and B (blue) filters are arranged two-dimensionally in the Bayer arrangement, on the top surface of the plurality of pixels. The image capturing device 102 is used to acquire the image data 5 that is a color image. Note that the image data acquired by the image capturing device 102 need not be a color image and may be a monochrome image.

Figure 2:
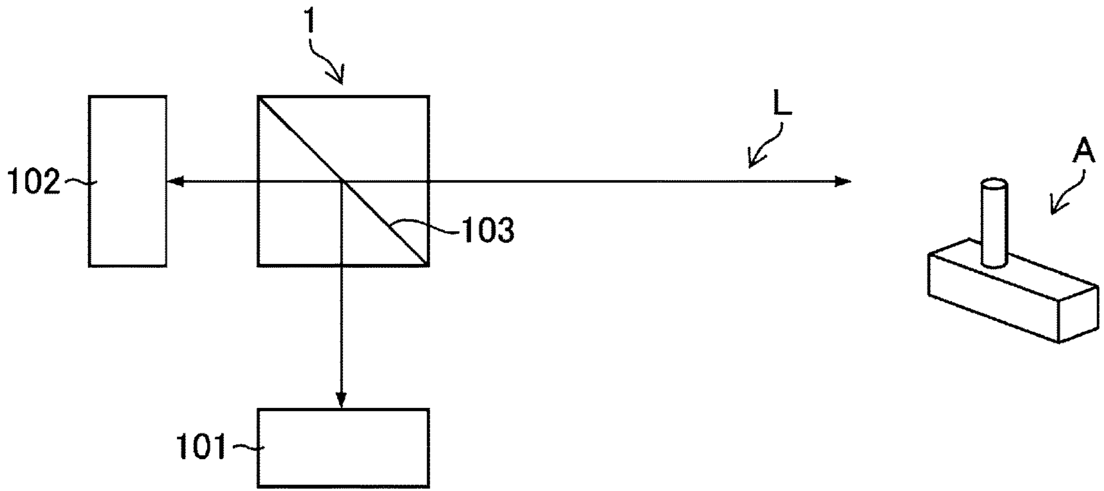
FIG. 2 is a schematic diagram for explaining a laser scanner and an image capturing device mounted in the three-dimensional measuring device.

FIG. 2 is a schematic diagram for explaining the laser scanner 101 and the image capturing device (camera) 102 mounted in the three-dimensional measuring device 1.

In the example illustrated in FIG. 2, a half mirror 103 is used, and the laser scanner 101 and the image capturing device 102 are disposed so as to have the same optical axis L. Note that the positional relationship between the laser scanner 101 and the image capturing device 102 is not limited to a specific relationship as long as the positional relationship is known. For example, the image capturing device 102 may be placed on top of the laser scanner 101 without having the same optical axis. The three-dimensional measuring device 1 can acquire the point cloud data 7 and the image data 5 simultaneously or serially.

Although the three-dimensional measuring device 1 acquires the point cloud data with the laser scanner 101, means for acquiring the point cloud data is not limited to the laser scanner 101. For example, the point cloud data may be acquired by using a ToF (time-of-flight) camera or a stereo camera.

Figure 3:
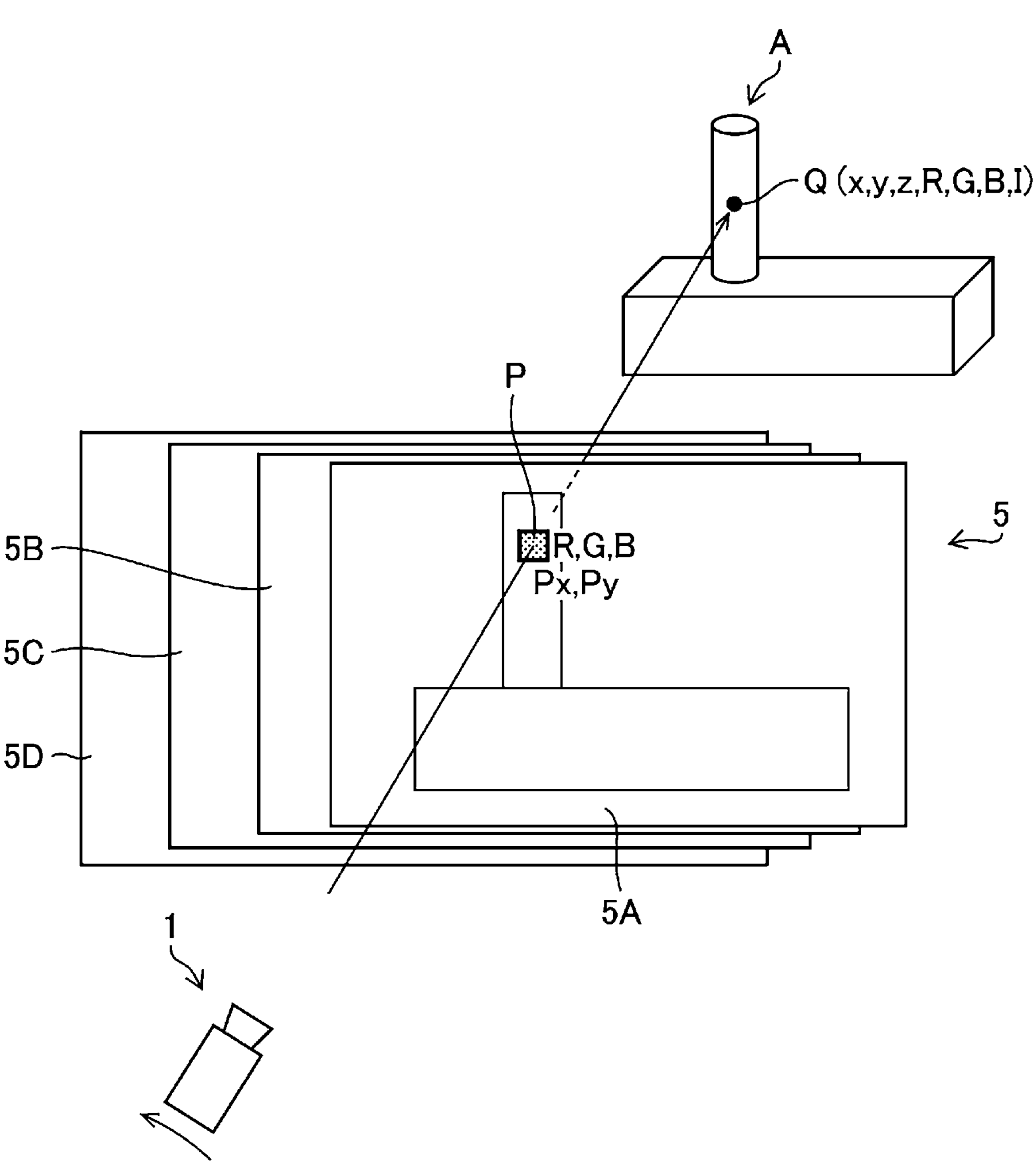
FIG. 3 is a schematic diagram for explaining that image data and point cloud data have a corresponding positional relationship.

FIG. 3 is a schematic diagram for explaining that the image data 5 and the point cloud data 7 have a corresponding positional relationship. In the example illustrated in FIG. 3, a plurality of pieces of image data 5 (pieces of image data 5A to 5D) are acquired. For example, when the three-dimensional measuring device 1 rotates in a pan direction, the plurality of pieces of image data 5A to 5D captured in different image capture directions are acquired. In the following description, a description of the image data 5A will be given.

The image data 5A is image data on which pixels P are arranged in two dimensions. Each pixel P has values of R, G, and B. FIG. 3 illustrates a pixel P having coordinates (Px, Py) on the image data 5A and a point Q having a corresponding positional relationship with the pixel P. The point Q constitutes the point cloud data 7 and has information including three-dimensional coordinates (x, y, z), which indicate positional information, and the R, G, and B values and the reflection intensity (I) of the corresponding pixel P. The correspondence relationship between the pixel P and the point Q can be acquired because the image data 5A and the point cloud data 7 have a corresponding positional relationship. Regarding the pieces of image data 5B to 5D, pixels and points have corresponding positional relationships as described above.

Now, the point cloud data processing apparatus 11 to which the pieces of image data 5 (pieces of image data 5A to 5D) and the point cloud data 7 thus acquired are input will be described.

Figure 4:
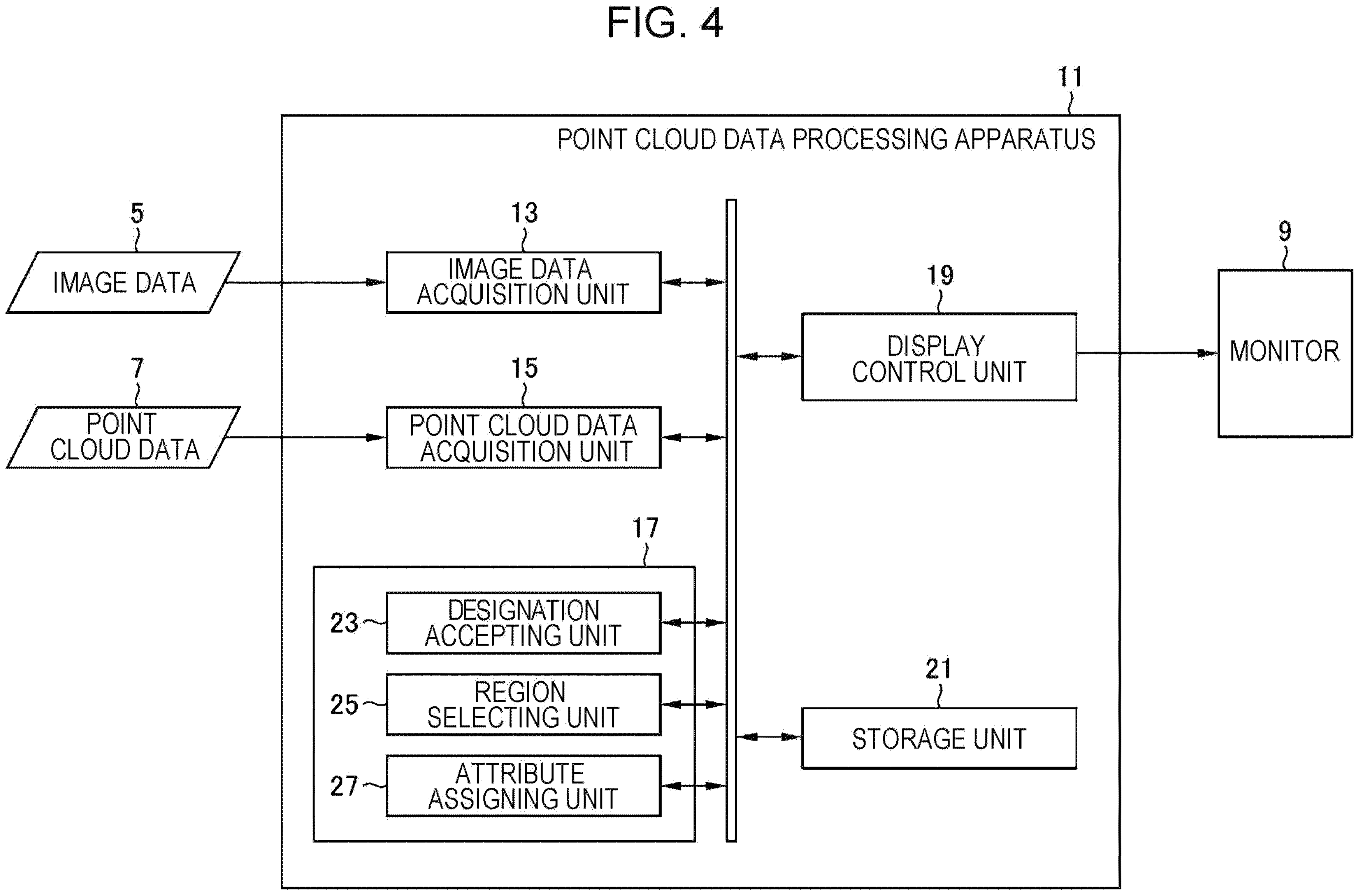
FIG. 4 is a block diagram illustrating an example functional configuration of a point cloud data processing apparatus.

FIG. 4 is a block diagram illustrating an example functional configuration of the point cloud data processing apparatus 11. The point cloud data processing apparatus 11 is formed of, for example, a computer. The point cloud data processing apparatus 11 may be mounted in the three-dimensional measuring device 1 or may be formed of a computer separate from the three-dimensional measuring device 1.

The point cloud data processing apparatus 11 includes an image data acquisition unit 13, a point cloud data acquisition unit 15, a control unit 17, a display control unit 19, and a storage unit (memory) 21.

The image data acquisition unit 13 acquires the plurality of pieces of image data 5A to 5D acquired by image capturing of the object A as image data. The image data acquisition unit 13 may acquire the plurality of pieces of image data 5A to 5D separately or may acquire composite image data acquired by combining the pieces of image data 5A to 5D.

The point cloud data acquisition unit 15 acquires the point cloud data 7. Pieces of point cloud data 7 respectively corresponding to the pieces of image data 5A to 5D are acquired. Similarly to the pieces of image data 5A to 5D, the pieces of point cloud data 7 respectively corresponding to the pieces of image data 5A to 5D may be combined and acquired.

The image data acquisition unit 13 and the point cloud data acquisition unit 15 acquire data by wire or wirelessly. The pieces of image data 5A to 5D acquired by the image data acquisition unit 13 and the pieces of point cloud data 7 acquired by the point cloud data acquisition unit 15 are acquired by the three-dimensional measuring device 1 described above and have corresponding positional relationships.

The control unit 17 is implemented by a CPU (central processing unit) (processor) (not illustrated) that is mounted in the computer executing a program stored in the storage unit 21. The control unit 17 includes a designation accepting unit 23, a region selecting unit 25, and an attribute assigning unit 27. The functions of the display control unit 19 are also implemented by the CPU executing the program stored in the storage unit 21.

The storage unit 21 stores the pieces of point cloud data 7 and the pieces of image data 5A to 5D, with the position of pixels being associated with points.

Figure 5:
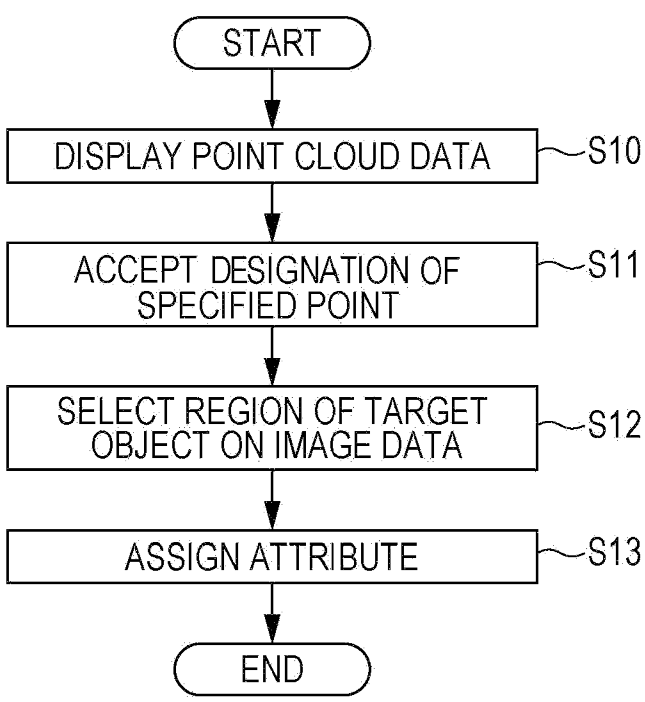
FIG. 5 is a flowchart illustrating a point cloud data processing method that is performed by using the point cloud data processing apparatus.

FIG. 5 is a flowchart illustrating a point cloud data processing method that is performed by using the point cloud data processing apparatus 11. The point cloud data processing method is performed by executing the program stored in the storage unit 21.

First, the display control unit 19 displays the point cloud data 7 stored in the storage unit 21 on a monitor (display unit) 9 (step S10: point cloud data displaying step). Subsequently, the designation accepting unit 23 accepts a designation of specified point in the point cloud data 7 displayed on the monitor 9 (step S11: specifying step). Next, the region selecting unit 25 selects the region of a target object including a region corresponding to the specified point, on image data (step S12: selecting step). The attribute assigning unit 27 assigns the same attribute information to the point cloud data 7 that corresponds to the region of the target object selected on the image data (step S13: attribute assigning step).

Each of the steps will be described in detail below.

Point Cloud Data Displaying Step and Specifying Step

The point cloud data displaying step (step S10) is performed by the display control unit 19. The designating step (step S11) is performed by the designation accepting unit 23. The display control unit 19 displays the point cloud data 7 stored in the storage unit 21 on the monitor 9.

Figure 6:
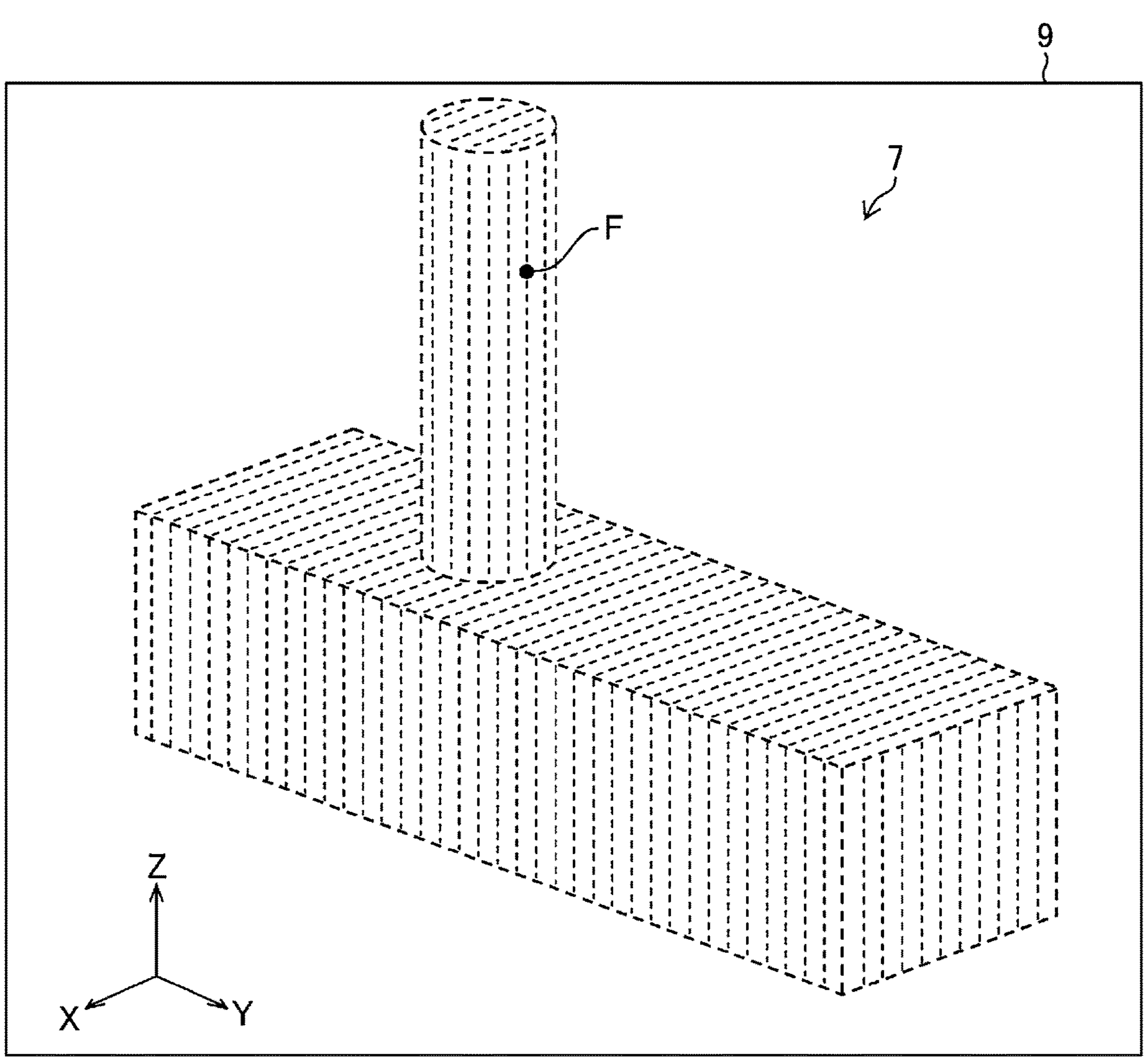
FIG. 6 is a diagram schematically illustrating point cloud data displayed on a monitor.

FIG. 6 is a diagram schematically illustrating the point cloud data 7 displayed on the monitor 9. The illustrated points schematically represent points of the point cloud data 7, and the outline of the object A is represented by dotted lines (imaginary lines).

The display control unit 19 causes the monitor 9 to display the point cloud data 7. Each of the points that constitute the point cloud data 7 has three-dimensional coordinates, and each point is displayed in the illustrated XYZ coordinate system on the basis of the three-dimensional coordinates. The point cloud data 7 is displayed on the monitor 9 such that three-dimensional rotation, three-dimensional movement, and rescaling are enabled. A user can rotate and move the point cloud data 7 three-dimensionally and rescale the point cloud data 7 by using a pointing device. Accordingly, when the point cloud data 7 is three-dimensionally rotated, three-dimensionally moved, and rescaled, the user can accurately specify a point F (specified point). In a case where a measurement target is constituted by a plurality of complicated objects or constituted by objects that overlap and are disposed complicatedly, the user can accurately specify a point by three-dimensionally rotating and moving the point cloud data 7 and rescaling the point cloud data 7. The user specifies the point F with a pointing device. The designation accepting unit 23 accepts the coordinate values of the point F to thereby accept the designation of the specified point.

Selecting Step

The selecting step (step S12) is performed by the region selecting unit 25. The region selecting unit 25 selects the region of a target object including a region corresponding to the specified point F, on the image data 5.

Figure 7:
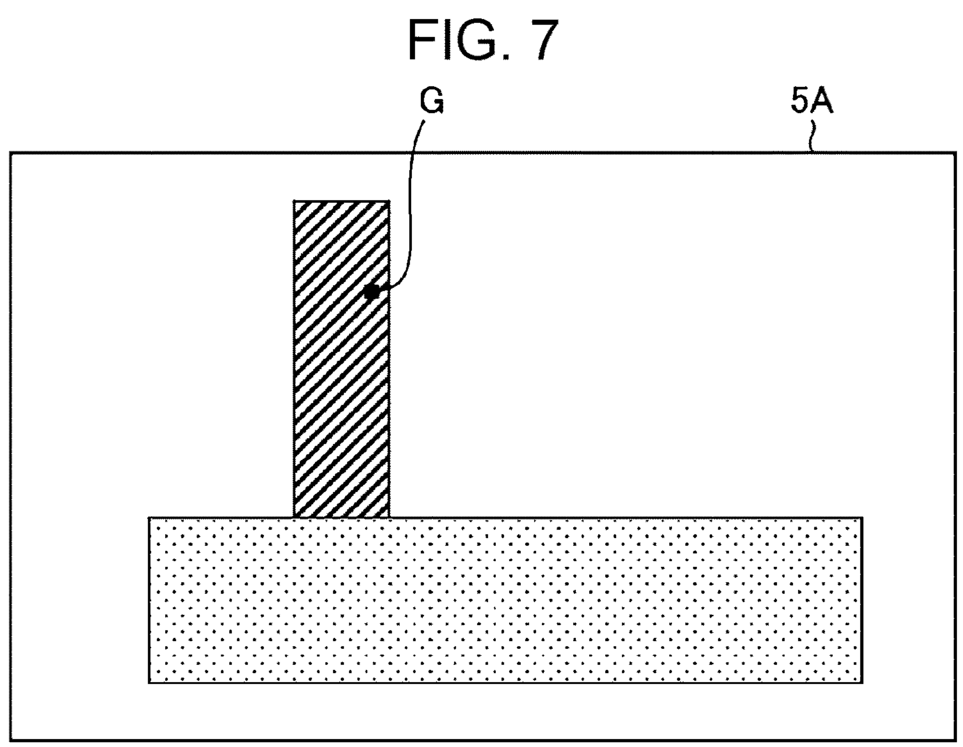
FIG. 7 is a diagram schematically illustrating image data.

FIG. 7 is a diagram schematically illustrating the image data 5A. The image data 5A has a region G that corresponds to the specified point F in the point cloud data 7. The region G is constituted by a single pixel or a plurality of pixels of the image data 5A. As described above, points that constitute the point cloud data 7 and pixels of the image data 5A have corresponding positional relationships. Therefore, when the region of a target object including the region G is selected on the image data 5A, a point cloud acquired from reflection on the surface of the object D including the specified point F can be identified. Selection of the region of a target object including the region G will be described below.

Figure 8:
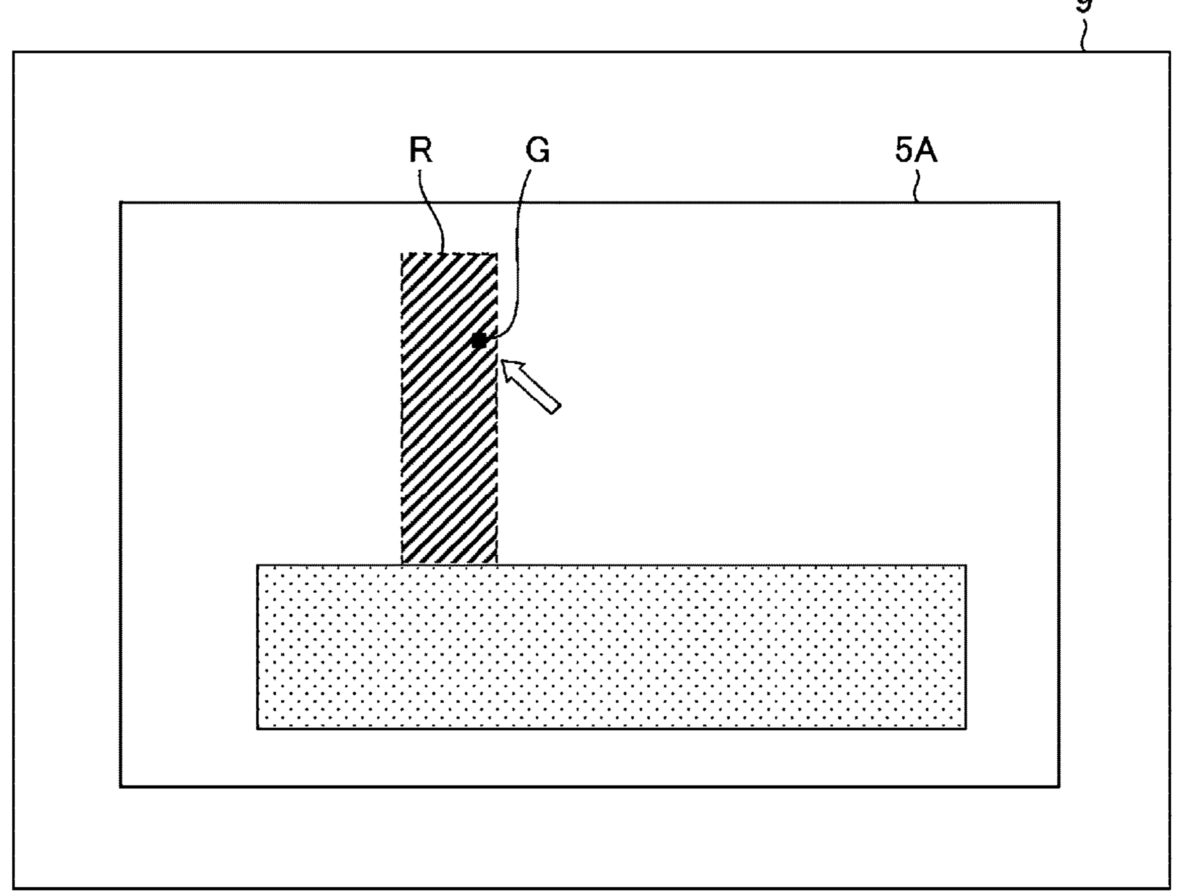
FIG. 8 is a diagram illustrating image data displayed on the monitor.

First, a case where the region of the target object is manually selected on the image data 5A will be described. FIG. 8 is a diagram illustrating the image data 5A displayed on the monitor 9. Although a case where the image data 5A is displayed will be described with reference to FIG. 8, a composite image acquired by combining the pieces of image data 5A to 5D may be displayed.

The display control unit 19 displays the image data 5A on the monitor 9. The display control unit 19 displays the image data 5A such that the user can check the region G in the image data 5A. For example, the display control unit 19 makes the color of the region G different from the color of the surrounding part or makes only the region G blink to thereby inform the user of the position of the region G. The user sees the image data 5A displayed on the monitor 9 and selects the region R of the target object with a pointing device. The region selecting unit 25 accepts selection of the region R by the user to thereby select the region R. The region R is the region of the object D and the user can check the object D on the image data 5A, and therefore, the user can easily select the region R.

Although manual selection of the region R by the user has been described with reference to FIG. 8, the present invention is not limited to this. For example, when the region selecting unit 25 is formed of a recognizer that is subjected to machine learning and the recognizer performs segmentation for the image data 5A, the region R can be selected.

The recognizer recognizes the object D on the basis of the image data 5A and selects the region R of the object D. The recognizer is a recognizer subjected to machine learning or deep learning, and performs segmentation for the image data 5A to thereby identify the region of the object. Note that in the segmentation, an existing model, such as FCN (Fully Convolutional Network), SegNet, or Pix2Pix, may be used, or a model that corresponds to the form of recognition of the object D performed by the recognizer may be separately created. As the learning of the recognizer, deep learning may be used or machine learning in a broad sense may be used.

Attribute Assigning Step

The attribute assigning step (step S13) is performed by the attribute assigning unit 27. The attribute assigning unit 27 assigns the same attribute information to points, in the point cloud data 7, corresponding to the region R. The attribute information is information that indicates from reflection on the surface of which object, the points result, and in other words, the attribute information is information indicating an object to which the points correspond. Pixels of the image data 5A and points of the point cloud data 7 have correspondence relationships, and therefore, the attribute assigning unit 27 can identify a point cloud corresponding to the region R in the image data 5A and assign attribute information (D). The region R is a region, in the image data 5A, corresponding to the object D, and therefore, the point cloud that is assigned the attribute information (D) is a point cloud resulting from reflection on the surface of the object D.

Figure 9:
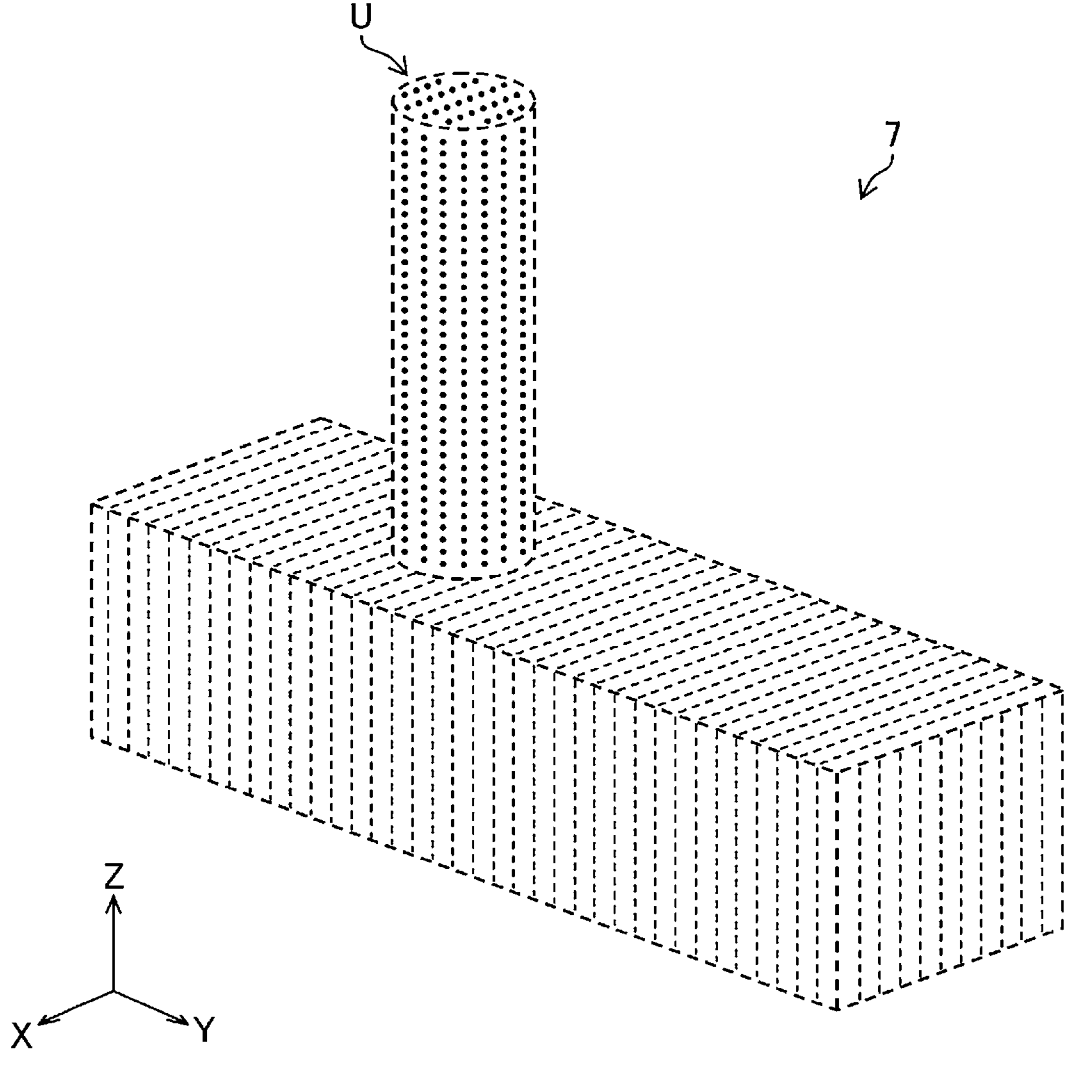
FIG. 9 is a diagram for explaining point cloud data that is assigned attribute information.

FIG. 9 is a diagram for explaining the point cloud data 7 that is assigned the attribute information (D).

In the point cloud data 7 illustrated in FIG. 9, a point cloud U that corresponds to the region R is assigned the attribute information (D). Points that are assigned the attribute information (D) are represented by black dots. The point cloud U is formed of a point cloud that is assigned the attribute information (D).

Accordingly, when the attribute information (D) is assigned to the point cloud U corresponding to the object D, the point cloud U can be easily used to create, for example, a solid model or a surface model that corresponds to the object D. Specifically, only the point cloud U can be extracted from the point cloud data 7 by using the attribute information (D), and a solid model or a surface model can be generated.

As described above, in the present embodiment, a point in the point cloud data 7 is specified, and the region R that includes the region G corresponding to the specified point is selected on the image data. The point cloud U, in the point cloud data 7, corresponding to the region R selected on the image data is identified, and the attribute information (D) is assigned to the point cloud U. The point cloud U that is assigned the attribute information (D) is a point cloud resulting from reflection on the surface of the object D. Accordingly, with the present form, the attribute information (D) can be efficiently and accurately assigned to points corresponding to the object D among points that constitute the point cloud data 7.

Others

In the description give above, grouping of the point cloud U that is a part of the point cloud data 7 has been described. However, grouping of the point cloud U is not always performed successfully. For example, in a case where the region R is selected on the image data 5A as described above and where a part that is apart from the boundary part to some extent is selected as the boundary part, attribute information might not be accurately assigned. In the present embodiment, in such a case, a correction is made to the attribute information. In the present embodiment, the control unit 17 includes a correction unit (not illustrated) to make a correction to the assigned attribute information.

Figure 10:
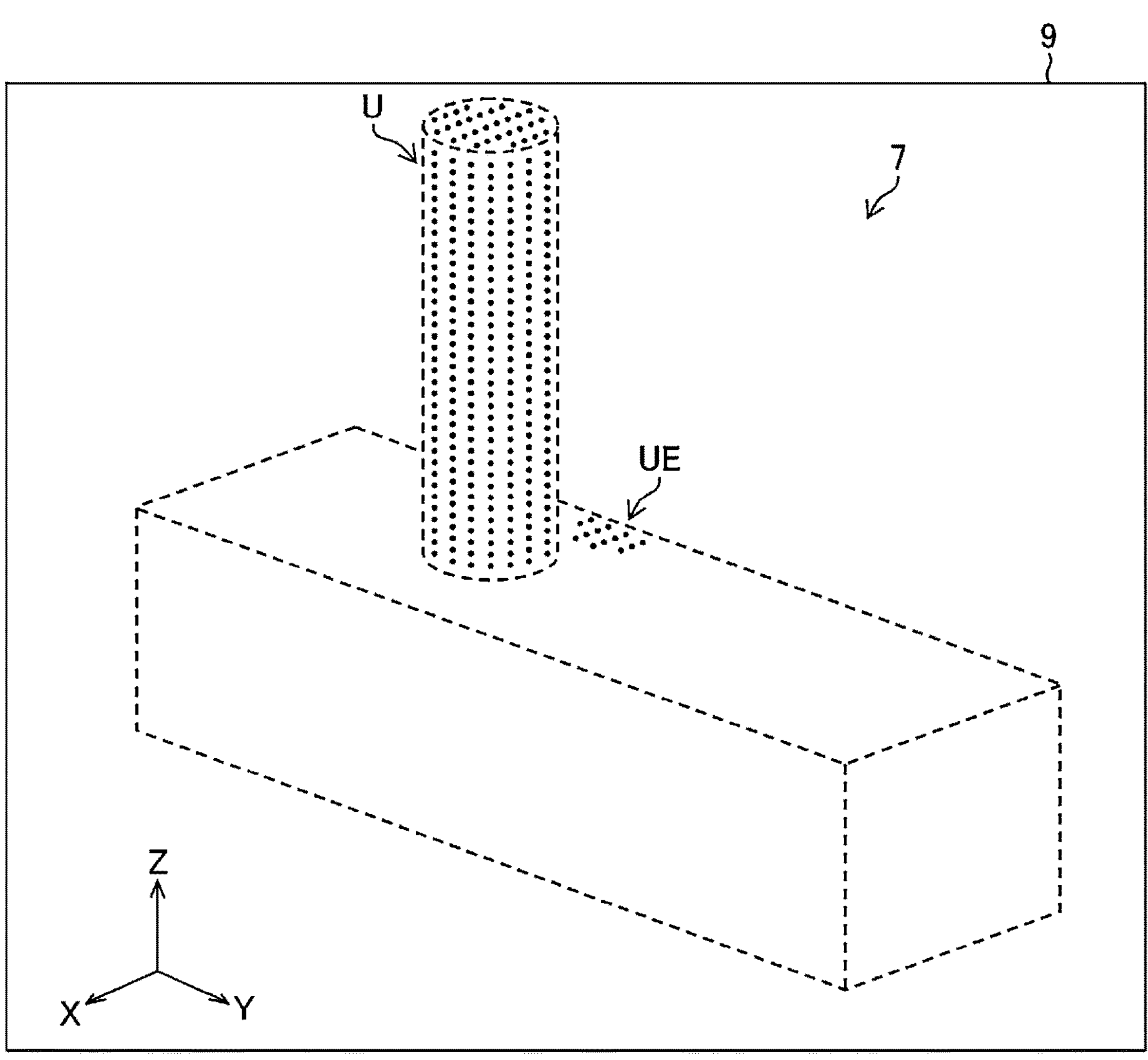
FIG. 10 is a diagram illustrating point clouds displayed on the monitor.

FIG. 10 is a diagram illustrating point clouds displayed on the monitor 9 and assigned attribute information W. Although a case where the attribute information W is assigned to the point cloud U that corresponds to the object D is assumed here, FIG. 10 illustrates a case where the attribute information W is assigned also to a point cloud (point cloud UE) other than the point cloud corresponding to the object D.

The display control unit 19 displays point clouds (point cloud U and point cloud UE) that are assigned the attribute information W, on the monitor 9. The user checks the displayed point clouds, determines that the point cloud UE does not correspond to the object D, selects the point cloud UE with a pointing device, and corrects the attribute information W assigned to the point cloud UE. The correction unit accepts the correction made by the user and corrects the attribute information W assigned to the point cloud UE.

Figure 11:
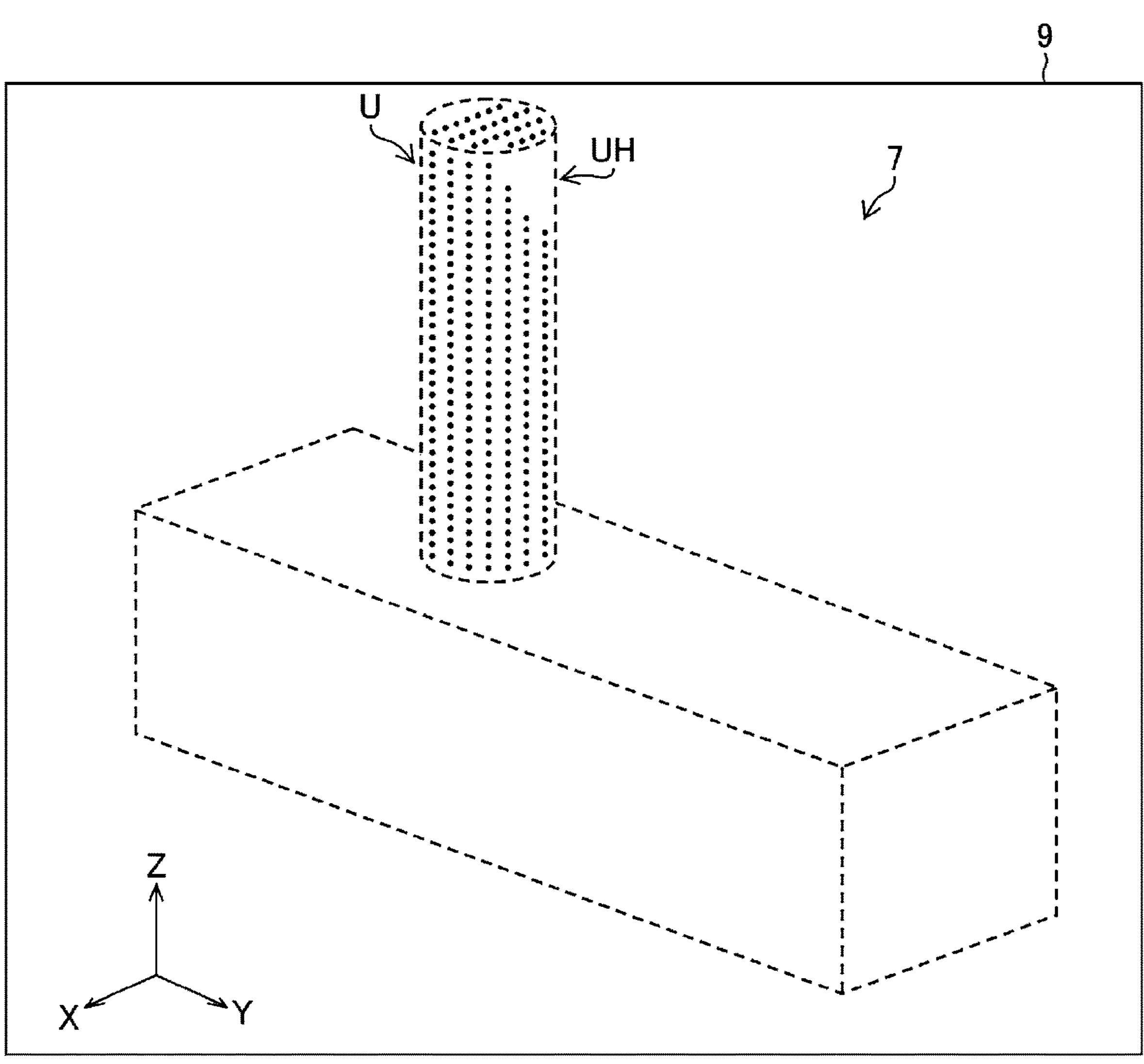
FIG. 11 is a diagram illustrating a point cloud displayed on the monitor.

FIG. 11 is a diagram illustrating a point cloud displayed on the monitor 9 and assigned the attribute information W. Although the case where the attribute information W is assigned to the point cloud U that corresponds to the object D is assumed here, FIG. 11 illustrates a case where the point cloud that is assigned the attribute information W includes an omitted region (region UH).

The display control unit 19 causes the monitor 9 to display the point cloud U that is assigned the attribute information W. The user checks the displayed region UH and adds a point cloud with a pointing device so as to fill the region UH. Accordingly, the correction unit adds the point cloud having the attribute information W to the region UH.

Although an example where the user manually corrects the assigned attribute information has been described in the example given above, the present invention is not limited to this example. For example, a recognizer subjected to machine learning may be used to correct the assigned attribute information.

Accordingly, in the present embodiment, a correction can be made to the assigned attribute information, and therefore, attribute information can be assigned to a point cloud more accurately.

In the embodiment described above, the hardware configuration of the processing units that perform various types of processing is implemented as various processors as described below. The various processors include a CPU, which is a general-purpose processor executing software (program) to function as various processing units, a programmable logic device (PLD), such as an FPGA (field-programmable gate array), which is a processor having a circuit configuration that is changeable after manufacture, and a dedicated electric circuit, such as an ASIC (application-specific integrated circuit), which is a processor having a circuit configuration specifically designed to perform specific processing.

One processing unit may be configured as one of the various processors or two or more processors of the same type or different types (for example, a plurality of FPGAs or a combination of a CPU and an FPGA). Further, a plurality of processing units may be configured as one processor. As the first example of configuring a plurality of processing units as one processor, a form is possible where one or more CPUs and software are combined to configure one processor, and the processor functions as the plurality of processing units, a representative example of which is a computer, such as a client or a server. As the second example thereof, a form is possible where a processor is used in which the functions of the entire system including the plurality of processing units are implemented as one IC (integrated circuit) chip, a representative example of which is a system on chip (SoC). As described above, regarding the hardware configuration, the various processing units are configured by using one or more of the various processors described above.

Further, the hardware configuration of the various processors is more specifically an electric circuit (circuitry) in which circuit elements, such as semiconductor elements, are combined.

The configurations and functions described above can be implemented as any hardware, software, or a combination thereof as appropriate. For example, the present invention is applicable to a program for causing a computer to perform the above-described processing steps (processing procedure), a computer-readable recording medium (non-transitory recording medium) to which the program is recorded, or a computer in which the program can be installed.

Although an example of the present invention has been described above, the present invention is not limited to the embodiment described above, and various modifications can be made without departing from the spirit of the present invention as a matter of course.

REFERENCE SIGNS LIST

1 three-dimensional measuring device
5 image data
7 point cloud data
9 monitor
11 point cloud data processing apparatus
13 image data acquisition unit
15 point cloud data acquisition unit
17 control unit
19 display control unit
21 storage unit
23 designation accepting unit
25 region selecting unit
27 attribute assigning unit
101 laser scanner
102 image capturing device
103 half mirror

What is claimed is:

1. A point cloud data processing apparatus comprising:
a memory configured to store positional information on a corresponding positional relationship between a position of each one of pixels of two-dimensional image data of a measurement target and one or more three-dimensional points that constitute three-dimensional point cloud data of three-dimensional points on a surface of the measurement target, the two-dimensional image data being acquired by image capturing of the measurement target, the measurement target comprising a plurality of objects in the two-dimensional image data; and a processor, the processor being configured to cause a monitor to display the three-dimensional point cloud data of the measurement target such that three-dimensional rotation, three-dimensional movement, and rescaling of the measurement target are enabled, accept a designation of a specified point in the three-dimensional point cloud data on a surface of an object among the plurality of objects of the measurement target displayed on the monitor, select, based on the positional relationship between the specified point in the three-dimensional point cloud data and the two-dimensional image data stored in the memory, an image region of a plurality of pixels of the object in the two-dimensional image data from among image regions of the plurality of objects of the measurement target in the two-dimensional image data, identify a plurality of three-dimensional points on the surface of the object from among three-dimensional points on surfaces of the plurality of objects of the measurement target in the three-dimensional point cloud data based on the positional relationship between the plurality of pixels of the object in the two-dimensional image data and the plurality of three-dimensional points on the surface of the object stored in the memory, and assign, to the plurality of three-dimensional points, information that identifies the object from among the plurality of objects of the measurement target to which the plurality of three-dimensional points corresponds.

2. The point cloud data processing apparatus according to claim 1, wherein the processor is configured to select the image region of the plurality of pixels of the object in the two-dimensional image data with a recognizer subjected to machine learning.

3. The point cloud data processing apparatus according to claim 1, wherein the processor is configured to cause the monitor to display the image region of the plurality of pixels of the object in the two-dimensional image data corresponding to the specified point after accepting the designation of the specified point.

4. The point cloud data processing apparatus according to claim 2, wherein the processor is configured to cause the monitor to display the image region of the plurality of pixels of the object in the two-dimensional image data corresponding to the specified point after accepting the designation of the specified point.

5. The point cloud data processing apparatus according to claim 3, wherein the processor is configured to display the two-dimensional image data of the measurement target on the monitor.

6. The point cloud data processing apparatus according to claim 4, wherein the processor is configured to display the two-dimensional image data of the measurement target on the monitor.

7. The point cloud data processing apparatus according to claim 3, wherein the processor is configured to accept selection of the image region of the plurality of pixels of the object in the two-dimensional image data selected on the two-dimensional image data displayed on the monitor.

8. The point cloud data processing apparatus according to claim 4, wherein the processor is configured to accept selection of the image region of the plurality of pixels of the object in the two-dimensional image data selected on the two-dimensional image data displayed on the monitor.

9. The point cloud data processing apparatus according to claim 5, wherein the processor is configured to accept selection of the image region of the plurality of pixels of the object in the two-dimensional image data selected on the two-dimensional image data displayed on the monitor.

10. The point cloud data processing apparatus according to claim 6, wherein the processor is configured to accept selection of the image region of the plurality of pixels of the object in the two-dimensional image data selected on the two-dimensional image data displayed on the monitor.

11. The point cloud data processing apparatus according to claim 1, wherein the processor is configured to, with respect to the plurality of three-dimensional points that is assigned the information representing that identifies the object, correct assignment of the information that identifies the object with a recognizer subjected to machine learning.

12. The point cloud data processing apparatus according to claim 2, wherein the processor is configured to, with respect to the plurality of three-dimensional points that is assigned the information that identifies the object, correct assignment of the information that identifies the object with a recognizer subjected to machine learning.

13. The point cloud data processing apparatus according to claim 3, wherein the processor is configured to, with respect to the plurality of three-dimensional points that is assigned the information that identifies the object, correct assignment of the information that identifies the object with a recognizer subjected to machine learning.

14. The point cloud data processing apparatus according to claim 4, wherein the processor is configured to, with respect to the plurality of three-dimensional points that is assigned the information that identifies the object, correct assignment of the information that identifies the object with a recognizer subjected to machine learning.

15. The point cloud data processing apparatus according to claim 5, wherein the processor is configured to, with respect to the plurality of three-dimensional points that is assigned the information that identifies the object, correct assignment of the information that identifies the object with a recognizer subjected to machine learning.

16. The point cloud data processing apparatus according to claim 6, wherein the processor is configured to, with respect to the plurality of three-dimensional points that is assigned the information that identifies the object, correct assignment of the information that identifies the object with a recognizer subjected to machine learning.

17. The point cloud data processing apparatus according to claim 1, wherein the processor is configured to display the plurality of three-dimensional points that is assigned the information that identifies the object on the monitor, and accept a correction concerning assignment of the information that identifies the object and correct the information that identifies the object based on the correction.

18. The point cloud data processing apparatus according to claim 1, wherein the processor is configured to acquire the two-dimensional image data and the three-dimensional point cloud data that are acquired by devices having a same optical axis.

19. A point cloud data processing method for a point cloud data processing apparatus comprising:

a memory configured to store positional information on a corresponding positional relationship between a position of each one of pixels of two-dimensional image data of a measurement target and one or more three-dimensional points that constitute three-dimensional point cloud data of three-dimensional points on a surface of the measurement target, the two-dimensional image data being acquired by image capturing of the measurement target, the measurement target comprising a plurality of objects in the two-dimensional image data; and a processor configured to control the point cloud data processing apparatus to perform the point cloud data processing method, the point cloud data processing method including:

causing a monitor to display the three-dimensional point cloud data of the measurement target such that three-dimensional rotation, three-dimensional movement, and rescaling of the measurement target are enabled, accepting a designation a specified point in the three-dimensional point cloud data on a surface of an object among the plurality of objects of the measurement target displayed on the monitor, selecting, based on the positional relationship between the specified point in the three-dimensional point cloud data and the two-dimensional image data stored in the memory, an image region of a plurality of pixels of the object in the two-dimensional image data from among image regions of the plurality of objects of the measurement target in the two-dimensional image data, identifying a plurality of three-dimensional points on the surface of the object from among three-dimensional points on surfaces of the plurality of objects of the measurement target in the three-dimensional point cloud data based on the positional relationship between the plurality of pixels of the object in the two-dimensional image data and the plurality of three-dimensional points on the surface of the object stored in the memory, and assigning, to the plurality of three-dimensional points, information that identifies the object from among the plurality of objects of the measurement target to which the plurality of three-dimensional points corresponds.

20. A non-transitory computer readable recording medium storing a program for causing a point cloud data processing apparatus to perform a point cloud data processing method, the point cloud data processing apparatus comprising:

a memory configured to store positional information on a corresponding positional relationship between a position of each one of pixels of two-dimensional image data of a measurement target and one or more three-dimensional points that constitute three-dimensional point cloud data of three-dimensional points on a surface of the measurement target, the two-dimensional image data being acquired by image capturing of the measurement target, the measurement target comprising a plurality of objects in the two-dimensional image data; and a processor which, when executing the program, causes the processor to control the point cloud data processing apparatus to perform the point cloud data processing method, the point cloud data processing method including:

causing a monitor to display the three-dimensional point cloud data of the measurement target such that three-dimensional rotation, three-dimensional movement, and rescaling of the measurement target are enabled, accepting a designation a specified point in the three-dimensional point cloud data on a surface of an object among the plurality of objects of the measurement target displayed on the monitor, selecting, based on the positional relationship between the specified point in the three-dimensional point cloud data and the two-dimensional image data stored in the memory, an image region of a plurality of pixels of the object in the two-dimensional image data from among image regions of the plurality of objects of the measurement target in the two-dimensional image data, identifying a plurality of three-dimensional points on the surface of the object from among three-dimensional points on surfaces of the plurality of objects of the measurement target in the three-dimensional point cloud data based on the positional relationship between the plurality of pixels of the object in the two-dimensional image data and the plurality of three-dimensional points on the surface of the object stored in the memory, and assigning, to the plurality of three-dimensional points, information that identifies the object from among the plurality of objects of the measurement target to which the plurality of three-dimensional points corresponds.

* * * * *